United States Patent
Linnartz

Patent Number: 5,933,798
Date of Patent: Aug. 3, 1999

[54] DETECTING A WATERMARK EMBEDDED IN AN INFORMATION SIGNAL

[75] Inventor: Johan P. M. G. Linnartz, Eindhoven, Netherlands

[73] Assignee: U.S. Philips Corporation, New York, N.Y.

[21] Appl. No.: 08/895,250

[22] Filed: Jul. 16, 1997

[30] Foreign Application Priority Data

Jul. 16, 1996 [EP] European Pat. Off. .............. 96202016

[51] Int. Cl.$^6$ .................................. G09C 5/00; H04L 9/00

[52] U.S. Cl. ................................................. 702/191; 380/4

[58] Field of Search ............................... 364/572, 471.01; 380/4, 25; 707/515, 715; 702/191

[56] References Cited

U.S. PATENT DOCUMENTS 5,664,018  9/1997  Leighton .................................. 380/54

FOREIGN PATENT DOCUMENTS

WO 9802864  1/1998  WIPO.

Primary Examiner—Kamini Shah
Attorney, Agent, or Firm—Steven S. Rubin

[57] ABSTRACT

To detect a watermark signal embedded within an information signal, predictive filtering is applied to either the information signal, a plurality of applied watermark signals, or both types of signals. After the filtering, a correlation is determined between the information signal and the watermark signals. The amount of the correlation is indicative of whether a particular watermark is embedded within the information signal.

8 Claims, 2 Drawing Sheets

# DETECTING A WATERMARK EMBEDDED IN AN INFORMATION SIGNAL

FIELD OF THE INVENTION

The invention relates to the field of digital data processing and more specifically to detecting messages embedded in multimedia signals that are not detectable by the audience of such signals.

BACKGROUND OF THE INVENTION

The invention relates to a method of detecting a watermark embedded in an information signal, comprising a correlation step for correlating said signal and an applied watermark, and an evaluation step for evaluating the result of said correlation. The invention also relates to a method for carrying out said method.

Watermarks are perceptually invisible messages embedded in multimedia content such as audio, still images, animations or video. They comprise information, for example, about the source or copy right status of documents or audiovisual programs. Watermarks can be used to provide legal proof of the owner of the copyright. They allow tracing of piracy and support the protection of intellectual property.

A known method of detecting a watermark embedded in an information signal comprises a correlation step for correlating said signal and an applied watermark. The result of said correlation is then evaluated. For example, if the amount of correlation is larger than a predetermined value, the applied watermark may be considered to be the watermark embedded in the signal. Alternatively, a number of successive correlation steps can be carried out for different applied watermarks. The applied watermark yielding the largest correlation is then considered to be the watermark embedded in the signal. The above citations are hereby incorporated in whole by reference.

SUMMARY OF THE INVENTION

It is an object of the invention, to provide a method with which an embedded watermark can yet more reliably be detected.

To that end, the method is characterized by the steps of predictive filtering the information signal or the applied watermark or both, and applying the correlation step to said filtered signal and said filtered watermark.

The invention is based on the recognition that the problem of detecting watermarks closely resembles the detection of weak radio or radar signals in the presence of strong interference or noise. By predictive filtering, i.e. subtracting a prediction of the information signal from said signal, a residual signal is obtained having a significant lower variance. This means that the interference which the watermark suffers from the residual information is considerably less than it suffers from the original signal.

DETAILED DESCRIPTION OF THE PREFFERED EMBODIMENT

The invention will herein be described by way of an example of detecting a watermark which is embedded in a digital video signal. The watermarks can be added in almost every domain such as, for example, the time domain, the spatial domain, the transform domain after DCT or Fourier transform, etc. In the present example, it is embedded in the spatial domain, i.e. it is added to the luminance pixel values of a digital video signal.

Figure 1:
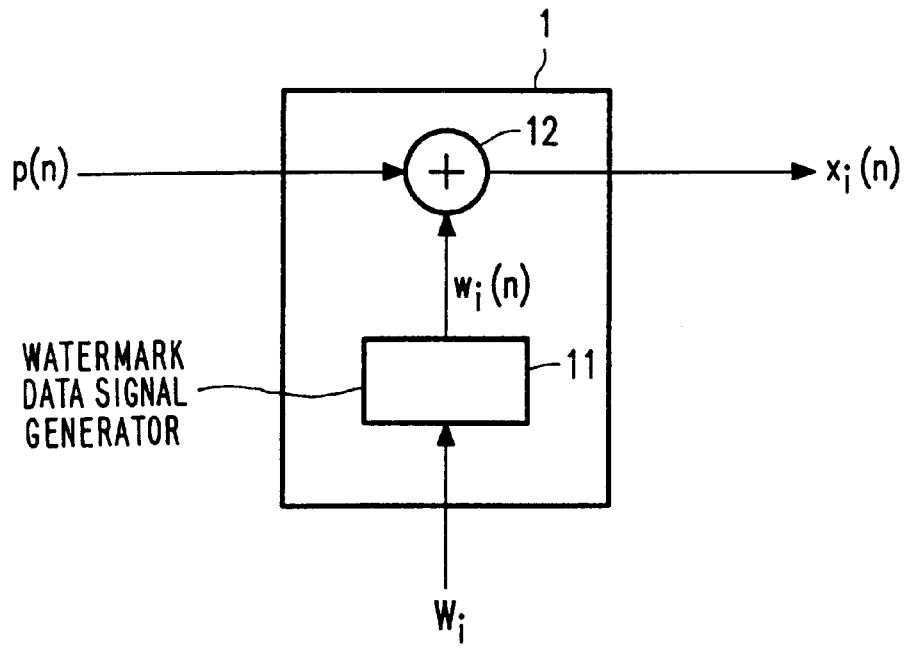
FIG. 1 shows schematically an arrangement for watermarking a video signal.

FIG. 1 shows schematically an arrangement 1 for watermarking the video signal. The arrangement receives a video signal in the form of luminance samples or pixels p(n) and a watermark $W_i$. The watermark can be a code which uniquely identifies the owner of the copyright. It can also be a text string or simply a binary coded number. Accordingly, there is a finite set of different watermarks $W_i$. The arrangement comprises a watermark data signal generator 11 which generates a predetermined watermark data signal $w_i(n)$ for each watermark $W_i$. The luminance value p(n) and watermark data value $w_i(n)$ are added by an adder 12 pixel-by-pixel. Accordingly, the output signal $x_i(n)$ of the watermarking circuit 1 is:

$$x_i(n) = p(n) + w_i(n)$$

The watermark data signal $w_i(n)$ is chosen such that it is perceptually invisible when the output signal is displayed on a receiver. For example, a small value is added to the luminance of selected pixels p(n) of the video image, the watermark $W_i$ determining the selected pixels. An example hereof will now be given in terms of an image of 8 pixels horizontally and 4 pixels vertically. It is to be noted that the method can also be applied to a predetermined part of the image. The method can also be applied to a plurality of image blocks, each block being associated with a portion of the watermark.

In the present example, the value 1 is added to the luminance of selected pixels whereas other pixels remain unaffected. The following equation denotes a watermark data signal $w_1(n)$ that is generated by watermark data signal generator 11 in response to a first watermark $W_1$:

$$w_1(n) = \begin{matrix} 0 & 1 & 0 & 1 & 0 & 1 & 0 & 1 \\ 1 & 0 & 1 & 0 & 1 & 0 & 1 & 0 \\ 0 & 1 & 0 & 1 & 0 & 1 & 0 & 1 \\ 1 & 0 & 1 & 0 & 1 & 0 & 1 & 0 \end{matrix}$$

The following equation denotes a watermark data signal $w_2(n)$ that is generated by the watermark data signal generator if a second watermark $W_2$ is applied:

$$w_2(n) = \begin{matrix} 0 & 0 & 1 & 1 & 0 & 0 & 1 & 1 \\ 1 & 1 & 0 & 0 & 1 & 1 & 0 & 0 \\ 0 & 0 & 1 & 1 & 0 & 0 & 1 & 1 \\ 1 & 1 & 0 & 0 & 1 & 1 & 0 & 0 \end{matrix}$$

In this manner, the watermark data signal generator 11 generates a different watermark data signal $w_i(n)$ for each watermark $W_i$.

In the present example, the video image is assumed to represent a vertical transition from a luminance value 10 to a luminance value 80. The range of luminance values p(n) is assumed to be 0–255. In mathematical notation:

$$p(n) = \begin{matrix} 10 & 10 & 10 & 10 & 80 & 80 & 80 & 80 \\ 10 & 10 & 10 & 10 & 80 & 80 & 80 & 80 \\ 10 & 10 & 10 & 10 & 80 & 80 & 80 & 80 \\ 10 & 10 & 10 & 10 & 80 & 80 & 80 & 80 \end{matrix}$$

Accordingly, if watermark $W_1$ is applied to arrangement 1, the watermark data signal $w_1(n)$ is added to image signal $p(n)$, which results in the following output signal $x_1(n)$:

$$x_1(n) = \begin{matrix} 10 & 11 & 10 & 11 & 80 & 81 & 80 & 81 \\ 11 & 10 & 11 & 10 & 81 & 80 & 81 & 80 \\ 10 & 11 & 10 & 11 & 80 & 81 & 80 & 81 \\ 11 & 10 & 11 & 10 & 81 & 80 & 81 & 80 \end{matrix}$$

Similarly, if watermark $W_2$ is applied to the watermarking arrangement, the watermark data signal $w_2(n)$ is added to image signal $p(n)$, which results in the following output signal $x_2(n)$:

$$x_2(n) = \begin{matrix} 10 & 10 & 11 & 11 & 80 & 80 & 81 & 81 \\ 11 & 11 & 10 & 10 & 81 & 81 & 80 & 80 \\ 10 & 10 & 11 & 11 & 80 & 80 & 81 & 81 \\ 11 & 11 & 10 & 10 & 81 & 81 & 80 & 80 \end{matrix}$$

It will be appreciated that neither the difference between an output signal $x_i(n)$ and input signal $p(n)$, nor the difference between output signals $x_1(n)$ and $x_2(n)$, is perceivable for a human visual system. The output signal $x_i(n)$ is stored on a storage medium such as an optical disc or a magnetic tape, or transmitted through a transmission channel (not shown in FIG. 1).

Figure 2:
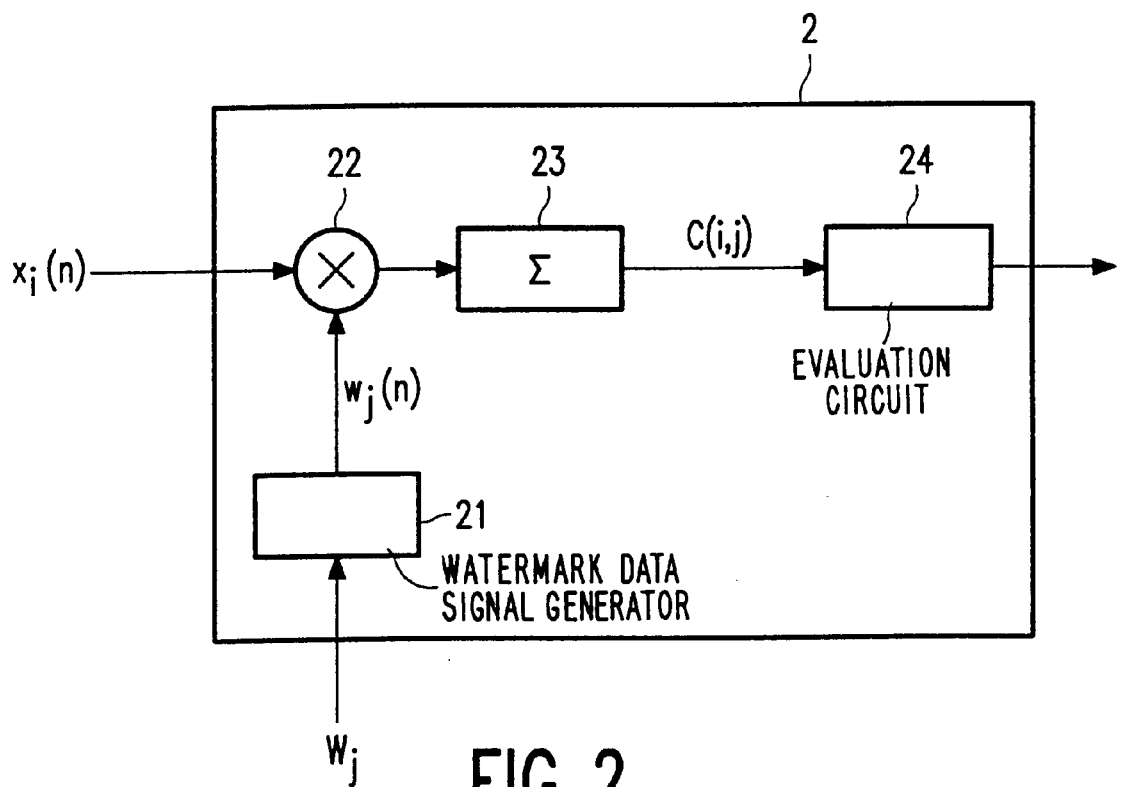
FIG. 2 shows schematically a prior art arrangement for detecting a watermark embedded in the signal which is generated by the arrangement shown in FIG. 1.

FIG. 2 shows schematically a an arrangement for detecting the watermark $W_i$ embedded in the signal $x_i(n)$ that does not utilize the invention herein. The arrangement receives a watermark $W_j$ and delivers an indication of whether or not the applied watermark $W_j$ resembles the embedded watermark $W_i$, i.e. whether i=j or not. The arrangement comprises a watermark data signal generator 21 which is identical to, and produces the same watermark data signal $w_j(n)$ as the watermark data signal generator 11 which is shown in FIG. 1. The input signal $x_i(n)$ and the watermark data signal $w_j(n)$ are applied to a circuit which is often referred to as a matched filter or correlator. In the embodiment shown in FIG. 2, said correlator comprises a multiplier 22 and a summation circuit 23. The correlator performs the following mathematical operation:

$$C(i,j) = \sum_{n=1}^{N} x_i(n) * w_j(n)$$

in which N denotes the total number of pixels. It will be appreciated that, if the information signal is an analog signal, for example a time continuous signal $x(t)$, the summation circuit 23 will be an integrator.

The correlator output is a number $C(i,j)$ which represents an amount of correlation between the input signal $x_i(n)$ and the watermark data signal $w_j(n)$. In an evaluation circuit 24, the value $C(i,j)$ is evaluated for various watermarks $W_j$. The watermark $W_j$ yielding the highest correlation is then assumed to be the watermark $W_i$. Only two different watermarks are considered here.

The correlation $C(i,j)$ can easily be calculated. If watermark $W_1$ is embedded in the signal, the correlation between $x_1(n)$ and $w_1(n)$ appears to be $C(1,1)=736$ whereas the correlation between $x_1(n)$ and $w_2(n)$ appears to be $C(1,2)=728$. Because $C(1,1)$ is greater than $C(1,2)$, the evaluation circuit 24 determines that the embedded watermark is $W_1$. If watermark $W_2$ is embedded, the correlation between $x_2(n)$ and $w_1(n)$ appears to be $C(2,1)=728$ whereas the correlation between $x_2(n)$ and $w_2(n)$ appears to be $C(2,2)=736$. Because $C(2,2)$ is greater than $C(2,1)$, the evaluation circuit 24 determines that the embedded watermark is $W_2$. The following Table I summarizes the above results. The rows of this Table denote input signal $x_i(n)$, i.e. the input signal in which a watermark $W_i$ is embedded. The columns denote watermark $W_j$ which is applied to arrangement 2.

TABLE I

|  | $W_1$ | $W_2$ |
| --- | --- | --- |
| $x_1(n)$ | $C(1,1) = 736$ | $C(1,2) = 728$ |
| $x_2(n)$ | $C(2,1) = 728$ | $C(2,2) = 736$ |

It will be appreciated from this example that the values of $C(i,j)$ representing the amounts of correlation are close to each other. This means that the detection circuit is vulnerable with respect to noise, transmission errors, coding errors, etc.

Figure 3:
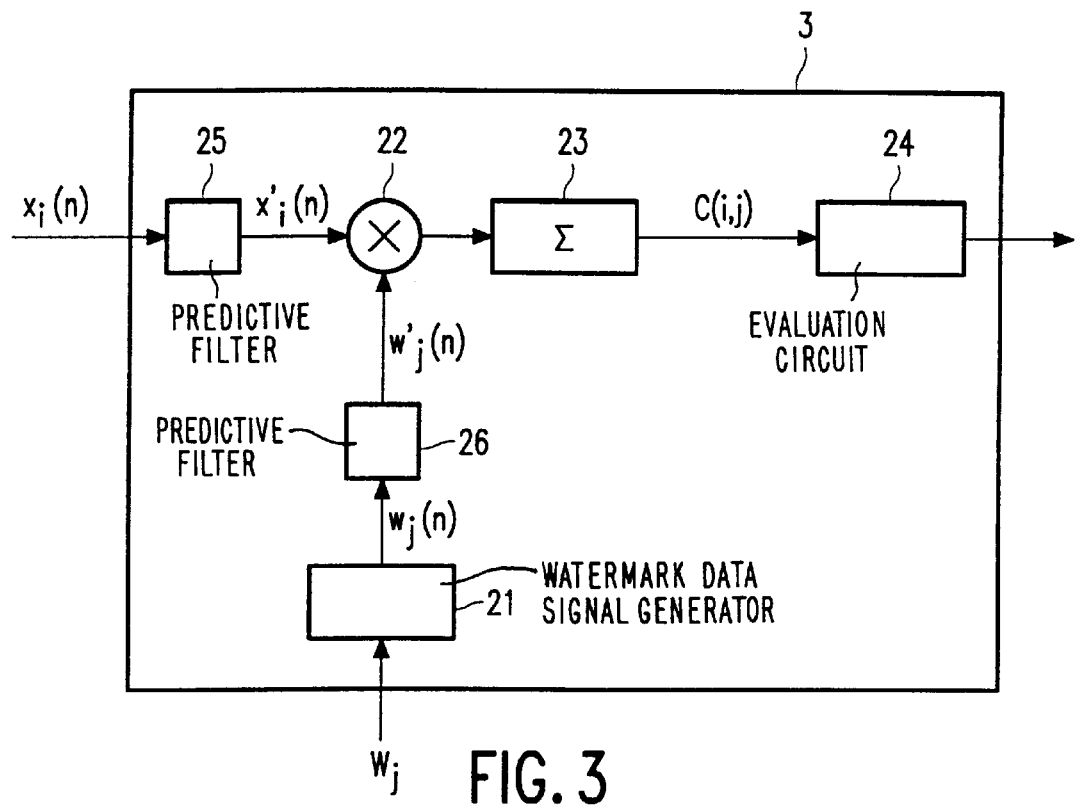
FIG. 3 shows schematically an arrangement for detecting the watermark in accordance with the invention.

FIG. 3 shows schematically an arrangement for detecting the watermark $W_i$ embedded in the signal $x_i(n)$ in accordance with the invention. The arrangement comprises the same watermark data signal generator 21, multiplier 22, summation circuit 23 and evaluation circuit 24 as are shown in FIG. 2. The arrangement further comprises a first predictive filter 25 and a second predictive filter 26. The first predictive filter 25 is connected between the signal input and the multiplier 22. It filters the input signal $x_i(n)$ and generates a filtered input signal $x_i'(n)$. The pre filtering process is also called "whitening", similar to filters that decorrelate noise in radar and radio communication receivers.

The second predictive filter 26 is connected between the watermark data signal generator 21 and the multiplier 22. It filters the locally applied watermark data signal $w_j(n)$ and generates a filtered watermark data signal $w_j'(n)$. The structure of each predictive filter is based on statistical properties of the information signal. Such filters are known per se in the field of source coding. Examples are linear predictive filters as used in DPCM image and speech coding. Other examples are combinations of a transform, a prediction for each frequency subband or transform coefficient, and an inverse transform.

In the present example, in which the input signal is a digital video image, predictive filter 25 predicts each pixel from its neighbors to the left, to the right, above and below. The predictive value is then subtracted from the actual pixel value to obtain a residual value. In mathematical notation:

$$y'(u,v) = y(u,v) - \frac{y(u-1,v) + y(u+1,v) + y(u,v-1) + y(u,v+1)}{4}$$

in which u and v denote discrete pixel positions along the horizontal (u) and vertical (v) axes, $y(u,v)$ denotes filter input samples and $y'(u,v)$ denotes filter output samples. Accordingly, the following equations supply to the filtered input signal $x_1'(n)$ and the filtered input signal $x_2'(n)$, respectively (a scaling factor 4 has been applied to maintain integer values):

$$x'_1(n) = \begin{matrix} 18 & 14 & 7 & -56 & 147 & 84 & 77 & 164 \\ 14 & -4 & 4 & -74 & 74 & -4 & 4 & 77 \\ 7 & 4 & -4 & -66 & 66 & 4 & -4 & 84 \\ 24 & 7 & 14 & -63 & 154 & 77 & 84 & 158 \end{matrix}$$

$$x'_2(n) = \begin{matrix} 19 & 8 & 13 & -57 & 148 & 78 & 83 & 163 \\ 13 & 3 & -3 & -73 & 73 & 3 & -3 & 78 \\ 8 & -3 & 3 & -67 & 67 & -3 & 3 & 83 \\ 23 & 13 & 8 & -62 & 153 & 83 & 78 & 159 \end{matrix}$$

Further, the first predictive filter 25 and the second predictive filter 26 are the same in this example. Although this is a preferred embodiment which yields the best performance, it is not essential. The filters may be different, or one of the predictive filters 25 and 26 may even be dispensed with. The performance of the watermark detecting arrangement is then still significantly better than the performance of the prior art arrangement. Accordingly, the following equations apply to the filtered watermark data signal $w_1'(n)$ and the filtered watermark data signal $w_2'(n)$, respectively:

$$w'_1(n) = \begin{matrix} -2 & 4 & -3 & 4 & -3 & 4 & -3 & 4 \\ 4 & -4 & 4 & -4 & 4 & -4 & 4 & -3 \\ -3 & 4 & -4 & 4 & -4 & 4 & -4 & 4 \\ 4 & -3 & 4 & -3 & 4 & -3 & 4 & -2 \end{matrix}$$

$$w'_2(n) = \begin{matrix} -1 & -2 & 3 & 3 & -2 & -2 & 3 & 3 \\ 3 & 3 & -3 & -3 & 3 & 3 & -3 & -2 \\ -2 & -3 & 3 & 3 & -3 & -3 & 3 & 3 \\ 3 & 3 & -2 & -2 & 3 & 3 & -2 & -1 \end{matrix}$$

The following Table II shows the amounts of correlation $C(i,j)$ between filtered input signal $x_i'(n)$ and filtered watermark data signal $w_j'(n)$ corresponding with watermark $W_j$. It will be appreciated from comparison with Table I that the performance of the watermark detector shown in FIG. 3 is significantly better than the one shown in FIG. 2.

TABLE II

|  | $W_1$ | $W_2$ |
| --- | --- | --- |
| $x_1'(n)$ | $C(1,1) = 1152$ | $C(1,2) = 704$ |
| $x_2'(n)$ | $C(2,1) = 704$ | $C(2,2) = 952$ |

Table III shows the amounts of correlation between filtered input signal $x_i'(n)$ and the unfiltered watermark data signal $w_j(n)$, i.e. if the input signal $x_i(n)$ is subjected to predictive filtering only. The watermark data signal $w_j(n)$ is directly applied to the multiplier 22 in this case. As can be seen, the performance is worse than in Table II but still better than in Table I.

TABLE III

|  | $W_1$ | $W_2$ |
| --- | --- | --- |
| $x_1'(n)$ | $C(1,1) = 604$ | $C(1,2) = 544$ |
| $x_2'(n)$ | $C(2,1) = 544$ | $C(2,2) = 588$ |

Table IV shows the amounts of correlation between the unfiltered input signal $x_i(n)$ and the filtered watermark data signal $w_j'(n)$, i.e. if the watermark data signal $w_j(n)$ is subjected to predictive filtering only. The input signal $x_i(n)$ is directly applied to the multiplier 22 in this case. Again, the performance is worse than in Table II but still better than in Table I.

TABLE IV

|  | $W_1$ | $W_2$ |
| --- | --- | --- |
| $x_1(n)$ | $C(1,1) = 604$ | $C(1,2) = 544$ |
| $x_2(n)$ | $C(2,1) = 544$ | $C(2,2) = 588$ |

Figure 4:
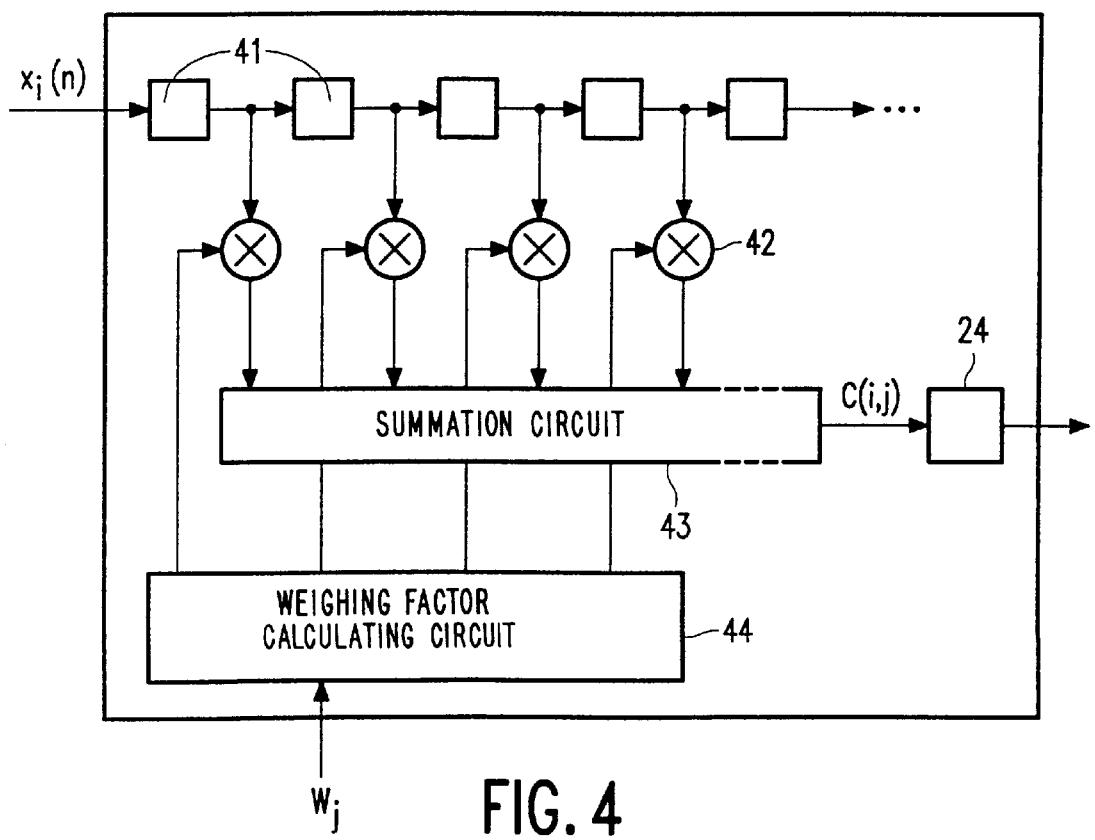
FIG. 4 shows schematically further an arrangement for detecting the embedded watermark in accordance with the invention.

FIG. 4 shows a further embodiment of an arrangement for detecting the embedded watermark. In this arrangement, pre-filter circuit 41 conditions the information input. Then each pixel of the input signal $x_i(n)$ is multiplied in a multiplier 42 by a specific weighting factor. The products are summed up in a summation circuit 43 which delivers the correlation value $C(i,j)$. A calculating circuit 44 receives the applied watermark $W_j$ and generates the weighting factors using a model of the statistical properties of the information signal. In this embodiment, predictive filtering is not applied to the watermark input signal but embedded in the calculation circuit 44.

In summary, a watermark embedded in an information signal is detected by correlating said information signal with a plurality of watermarks $W_j(n)$. The respective amounts of correlation $C(i,j)$ are then evaluated to determine the watermark embedded in the signal $x_i(n)$. The invention provides a significant improvement of the detection by predictive filtering (25) the information signal and/or predictive filtering (26) the applied watermark prior to the process of correlating the signals. The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

I claim:

1. A method of detecting a watermark signal embedded in an information signal, comprising the steps of:
   providing an applied watermark signal:
   predictive filtering of the information signal or the applied watermark signal or both; correlating the information signal and the applied watermark signal; and
   evaluating the result of said correlation.
2. The method of claim 1, wherein the predictive filtering is adapted to predetermined statistical properties of the information signal.
3. The method of claim 1, wherein both the information signal and applied watermark signal are predictive filtered and the predictive filter steps are the same.
4. A method of detecting a watermark embedded in an information signal, comprising the steps of:
   filtering the information signal using filter coefficients determined by an applied watermark signal, and by a model of the statistical properties of the information signal:
   and evaluating the result of said filtering.
5. An arrangement for detecting a watermark signal embedded in an information signal, comprising:
   correlation means for correlating the information signal and an applied watermark signal and:
   evaluation means for evaluating the result of said correlation, communicating with the correlation means; and a predictive filter for filtering the information signal or for filtering the applied watermark, or both, and connected for applying the filtered signal and the filtered watermark to the correlation means.

6. The arrangement of claim 5, wherein the predictive filter includes means to filter depending on predetermined statistical properties of the information signal.

7. The arrangement of claim 5, wherein the predictive filter includes a first predictive filter for filtering the information signal and a second predictive filter for filtering the applied water mark and both predictive filters are identical.

8. An arrangement for detecting a watermark signal embedded in an information signal, comprising:

a filter for filtering said information signal using filter coefficients:

calculation means for calculating said filter coefficients in dependence on an applied watermark and a model of the statistical properties of the information signal; and means for evaluating the result of said filtering.

* * * * *